Figure 1:
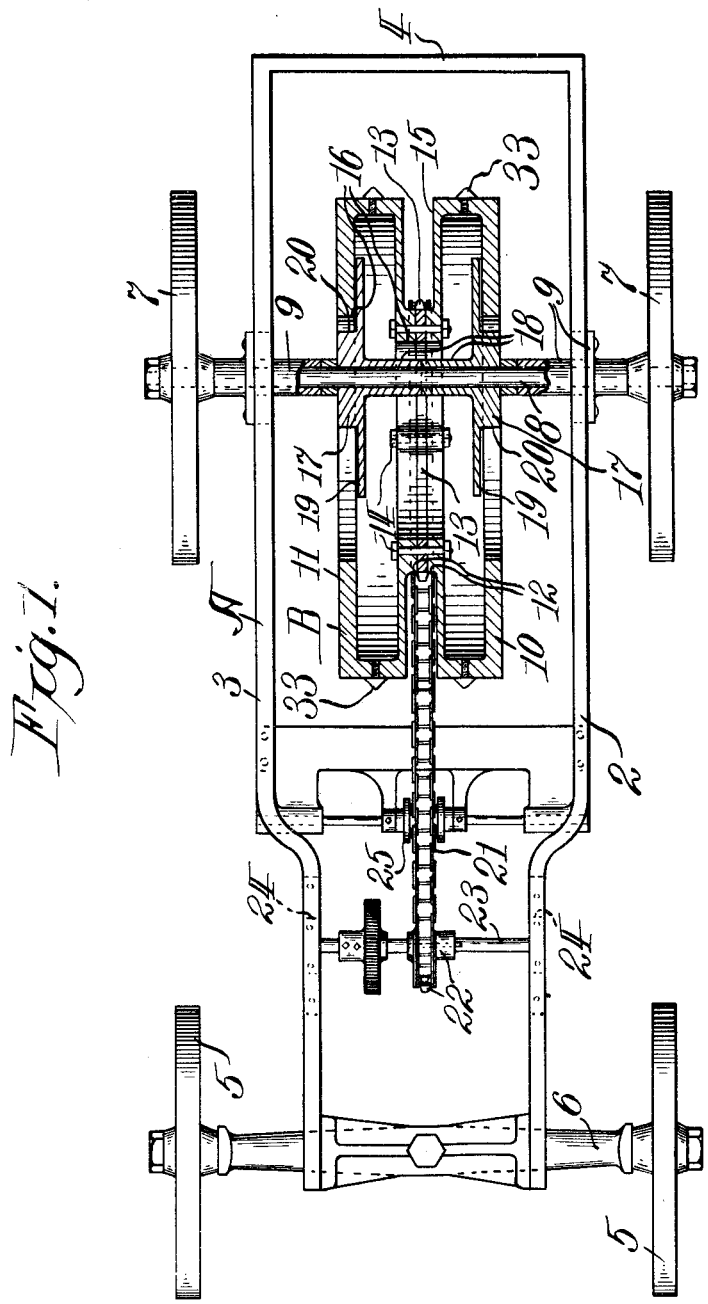

W. A. SORG.
PROPELLER MEANS FOR SELF PROPELLED VEHICLES.
APPLICATION FILED MAY 27, 1912.

1,062,422.   Patented May 20, 1913.
2 SHEETS—SHEET 1.

Witnesses:   Inventor:
   William A. Sorg,
   by ........ Attorney.

W. A. SORG.
PROPELLER MEANS FOR SELF PROPELLED VEHICLES.
APPLICATION FILED MAY 27, 1912.
1,062,422.
Patented May 20, 1913.
2 SHEETS—SHEET 2.
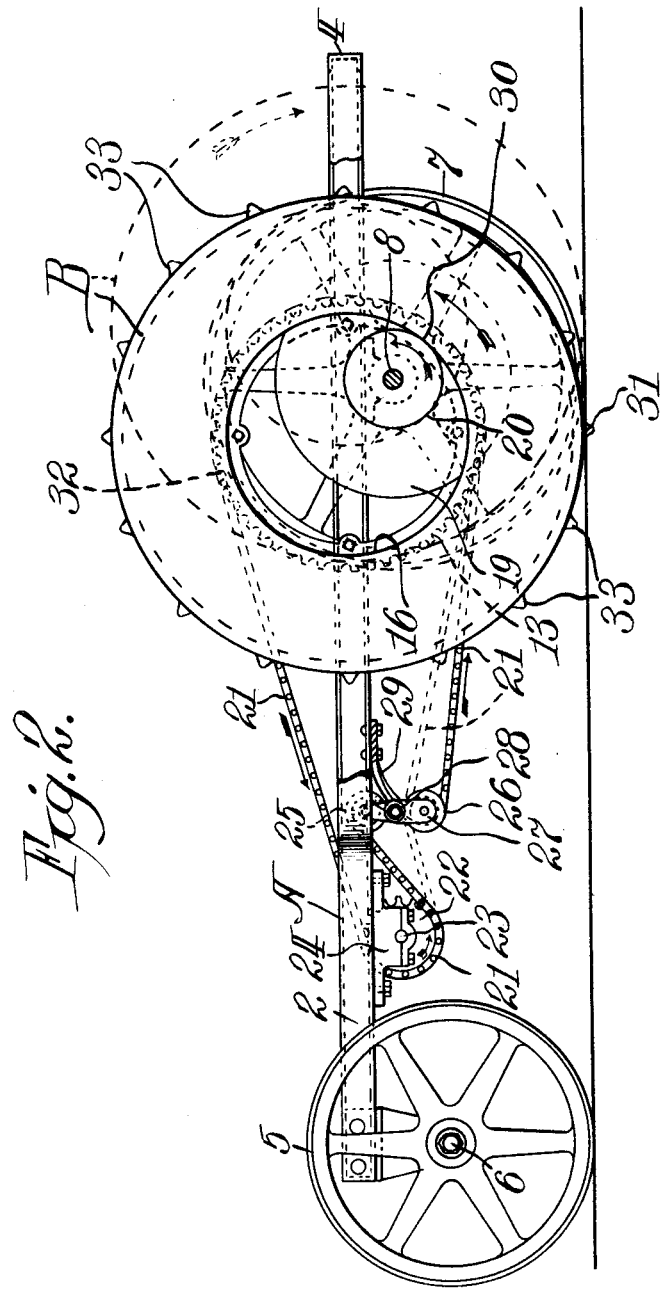
Witnesses:
Inventor:
William A. Sorg,
by: Bradbury
Attorney.

UNITED STATES PATENT OFFICE.

WILLIAM A. SORG, OF MINNEAPOLIS, MINNESOTA.

PROPELLER MEANS FOR SELF-PROPELLED VEHICLES.

1,062,422.  Specification of Letters Patent.  Patented May 20, 1913.

Application filed May 27, 1912. Serial No. 699,846.

*To all whom it may concern:*

Be it known that I, WILLIAM A. SORG, a citizen of the United States, residing at Minneapolis, in the county of Hennepin and State of Minnesota, have invented a new and useful Improvement in Propeller Means for Self-Propelled Vehicles, of which the following is a specification.

This invention relates to an improvement in traction machinery or vehicles.

The forward movement of any automobile tractor or car is the result of the rotating force of the drive wheel coming in frictional contact with the ground and the limits of traction are: 1. The power which is applied to the drive wheel. 2. The weight of the vehicle. 3. The resistant condition of the ground or surface with which the drive or tractor wheel is in contact.

There has been no difficulty in obtaining the power necessary to propel a vehicle but the increased weight necessary to obtain the necessary traction has retarded the progress of traction vehicles. Experience has proven that when more power is added, more weight must be added to keep the drive wheels in contact with the ground. My tractor avoids and overcomes these difficulties and provides a means for obtaining great tractive power without increasing the weight, the power being applied in such a way as to make a relatively small weight give sufficient traction to pull a heavy load. The other limit of traction is the condition of the ground or surface with which the tractor wheels come in contact, in service; and with the conventional type of tractor wheel which revolves around a fixed point (the axle), a digging effect is exerted as soon as the ground resistance is less than the power, and a few revolutions of the wheel buries the machine deeply into the ground. With my traction device this digging effect is entirely obviated, and the tractor can be used in soft fields during the spring as well as the other seasons of the year. Furthermore, the forces which on other tractor wheels are applied to a rotating wheel and the resultant of said forces having a tendency to carry the load forward and downward, are so applied to my wheel that the load is lifted upward and forward.

Another difficulty with the ordinary tractor machine is the fact that it requires large wheel surface with long spurs to hold it in contact with the ground in ordinary soil, and this together with the great weight necessary make the vehicle impracticable for anything except field service, or vice versa make a vehicle adapted for road service impracticable for field service. My tractor wheel automatically adjusts itself to the nature of the soil whether in the field or on pavement, and the spurs or corks are driven in contact with the ground just sufficiently to obtain the necessary traction and no more. To illustrate further, in case my tractor is running in a soft field it automatically picks up the entire load on the drive wheel and drives the corks entirely into the ground, while a moment later, if the machine is driven on a hard road, only a small portion of that load will be applied to the tractor wheel in order to give the required contact with the ground. This feature of automatic adjustment according to load is a great power saver, and it further improves a tractor so that it will operate successfully in soft ground or do ordinary farm work and hauling on roads, without changing wheels.

In the drawings which form part of my specification, Figure 1 is a plan, a portion of which is in section and Fig. 2 is a side elevation, part of which is broken away.

For convenience in illustrating the invention, a simple running gear having a frame A, the sides 2 and 3 and the end 4 of which are formed of channel iron. The forward end of the frame is supported by wheels 5 journaled freely on the axle 6. The rear portion of the frame A is supported by the wheels 7 journaled freely on the axle 8 which is secured to the sides 2 and 3 of the frame by suitable supports 9. This running gear described is of ordinary construction and the invention is either applicable to it or to any other form or design of running gear desired.

Centrally between the sides 2 and 3 of the frame and disposed freely about the axle 8 is an annular drive wheel B which is adapted to ride upon the surface of the road and for convenience in assembling is formed in two similar hollow annular sections 10 and 11 disposed end to end. On the adjacent faces of the sections 10 and 11 are projecting bosses 12 which are of less diameter than the diameter of the parts 10 and 11. Between these bosses a sprocket 13 is secured by bolts 14 which also serve to hold the parts 10 and 11 together.

The sprocket 13 and the parts 10 and 11 are secured together on the same axis. The bosses 12 on the adjacent faces of the sections 10 and 11 together with the sprocket 13 which is slightly larger in diameter than the diameter of the bosses serve to space the adjacent faces of the sections 10 and 11 apart leaving an annular channel 15 in the face of the floating wheel B for the application of a drive chain or other driving means which will be hereinafter described. The floating wheel B has a large circular opening 16 through its ends and on its axis and through which the axle 8 passes. Freely journaled on the axle 8 between the supports 9 are similar idle antifriction rollers 17 forming a bearing support for the drive wheel B. These rollers have long adjacent journals 18 and outwardly extending circular flanges 19 extending into the parts 10 and 11 of the drive wheel B and serving to engage the same to limit the movement of the drive wheel B laterally and hold it in alinement with the frame A and in a plane substantially parallel to the planes of carrying wheels 7. The flanges 19 being spaced slightly from the inner walls of the drive wheel allow a limited amount of tilting movement of said wheel sufficient to overcome inequalities in the surface of the road. It will be noted that when the floating wheel B is in working engagement with its bearing its axis is eccentric to the axis of the bearing.

Wear faces 20 on the bearing rollers 17 are positioned so as to be engaged by the peripheries of the openings 16 on the opposite sides of the drive wheel. The drive wheel is adapted to be driven by a chain 21 or other suitable means, which engages the sprocket 13 and is mounted over a driving sprocket 22. The sprocket 22 is keyed to a shaft 23 which is journaled in suitable bearings 24 on the frame A. Said shaft 23 can be driven by any suitable source of power such as an internal combustion engine (not shown).

The drive chain 21 passes over idle pulleys 25 and 26 which are freely journaled on a slack adjuster support 27. Said support is pivotally mounted at 28 midway between its ends on a bracket 29 secured to the frame A. When it is desired to drive the vehicle forward the driving chain 21 operates in the direction of the arrows and the floating drive wheel B will assume the position shown in Fig. 2. It will be noted that the pull of the chain 21 is in a plane intersecting the axis of the drive wheel B thereby insuring an even drive at all times. Thus the wheel B will act in the capacity of what is termed a second class lever engaging the bearing rollers 17 at a point say 30 which would be designated as the load, the fulcrum being at 31 and the application of power at the point 32 (see Fig. 2). Thus the load is driven forward with a powerful leverage which owing to the eccentric position of the bearing as regards the drive wheel tends to lift the load and force the short spurs 33 on the periphery of the drive wheel into firm engagement with the surface of the ground.

The idle pulley 26 being of solid metal makes it heavier than the pulley 25 which is hollow or cast of light material, thus the pulleys owing to the difference in weight explained and the pull of the chain, will assume the position shown in Fig. 2. When the drive is reversed and the chain 21 is driven in the opposite direction the drive wheel B will assume the position illustrated in dotted outline in Fig. 2 and will bear upon idlers 17 to drive the vehicle in backward direction. The idle pulleys 25 and 26 will then change in position, the pulley 25 and the chain 21 will be in the position illustrated in dotted outline (see Fig. 2). Thus the chain will lengthen out to compensate for the changing of position of the driving wheel B (illustrated in dotted outline, Fig. 2). The parts will again come into the positions illustrated in full line in Fig. 2 when the wheel B is driven in forward direction.

It will be readily seen that this invention is exceedingly simple, and that a great initial power is available at all times for the purpose of overcoming large obstructions. It is further to be noted that the device can be applied to any ordinary running gear, said gear employing ordinary supporting wheels which will run in the ruts of ordinary roads which is an advantage. The application of driving force and distribution of the weight of the parts places the center of gravity low down near the longitudinal center line of the vehicle making the vehicle difficult to tip over. The construction also obviates the use of differential gearing which is a distinct advantage.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:

1. In a self propelled vehicle having a supporting frame and carrying elements therefor, a propelling wheel having a concentric impelling surface and a bearing carried by said frame against which said impelling surface is adapted to impinge freely, the point of contact between said bearing and impelling surface being changed during the operation of the vehicle.

2. In a self propelled vehicle having a supporting frame and carrying elements therefor, a propelling wheel having a concentric impelling surface, a bearing carried by said frame against which said impelling surface is adapted to impinge freely, the contact between said bearing and impelling surface being changed from one point to another when the propelling wheel is reversed and means for driving said propelling wheel.

3. In a self propelled vehicle having a supporting frame and carrying elements therefor, a propelling wheel having a concentric impelling surface, a bearing carried by said frame against which said impelling surface is adapted to impinge freely, the point of contact between said bearing and impelling surface being changed when the propelling wheel is reversed and adjustable means for driving said wheel adapted to compensate for the change of said contact.

4. In a self propelled vehicle having a supporting frame and carrying wheels therefor, an annular propelling wheel adapted to engage the surface of the ground, means carried by said frame for revolving said propelling wheel and a bearing carried by said frame within said wheel, said wheel being freely disposed as regards said bearing and adapted to impinge against said bearing when revolving forwardly or backwardly to propel said vehicle.

5. In a self propelled vehicle having a supporting frame and carrying wheels therefor, a propelling wheel having a circular impelling surface concentric with its periphery, means for revolving said propelling wheel and a bearing carried by said frame against which the propelling surface of said propelling wheel is adapted to revolve and drive said vehicle, said wheel being freely disposed as regards said bearing.

6. In a self propelled vehicle having a supporting frame and carrying wheels therefor, a propelling wheel freely disposed as regards said frame and having an impelling surface concentric with the periphery of said propelling wheel, means for revolving said propelling wheel and an antifriction bearing carried by said frame and against which said impelling surface is adapted to revolve to propel said vehicle, said impelling surface being of larger diameter than the diameter of said bearing, whereby said propelling wheel is free to ride upon and engage the surface of the ground independent of the movement of said vehicle.

7. In a self propelled vehicle having a frame and carrying wheels therefor, propelling means in the form of a second class lever comprising three coöperating elements, one an annular driving wheel adapted to roll upon and engage the surface of the ground and having an inner concentric surface, another an antifriction bearing carried by said frame and against which the inner surface of said annular wheel is adapted to impinge and the other means carried by said frame for revolving said drive wheel with its inner concentric surface against said bearing.

8. In a self propelled vehicle, a supporting frame and carrying wheels for said frame, a floating propelling wheel freely disposed in said frame and adapted to ride upon and engage the surface of the ground independent of said frame and carrying wheels, said propelling wheel having an impelling surface concentric with the periphery of said propelling wheel, a gear carried by said propelling wheel, a power element carried by said frame and having a drive gear, a chain transmission over said gears, a slack adjuster associated with said chain, an antifriction bearing carried by said frame and against which the impelling surface of said drive wheel is adapted to engage to propel said vehicle, the diameter of said bearing being less than the diameter of said propelling wheel whereby said propelling wheel is freely disposed as regards said bearing and vehicle.

9. In a self propelled vehicle having a supporting frame and carrying wheels therefor, an annular propelling wheel having an impelling surface of less diameter than the diameter of said wheel and concentric with the periphery of said wheel, means for limiting the lateral movement of said propelling wheel in said frame and an antifriction bearing carried by said frame against which said impelling surface is adapted to revolve to drive said vehicle, said bearing being of less diameter than the diameter of said impelling surface whereby said wheel is free to ride upon the surface of and engage the ground independent of said vehicle, means carried by said frame for revolving said wheel and a slack adjuster associated with said driving means adapted to equalize the length of said driving means according to the distance between said driving means and said propelling wheel during the operation of the latter.

10. In a self propelled vehicle having a frame and carrying wheels therefor, propelling means comprising three coöperating elements, one an annular driving wheel adapted to roll upon and engage the surface of the ground and having a pair of inner concentric surfaces disposed laterally apart, another an antifriction roller bearing carried by said frame and against the periphery of which said concentric surfaces are adapted to impinge the diameter of said bearing being less than the diameter of either of said concentric surfaces, and the other means carried by said frame for revolving said driving wheel with its inner concentric surfaces against the periphery of said bearing, said revolving means being applied to said wheel in a plane substantially midway between the planes of said concentric surfaces, whereby driving force is evenly applied to said wheel and said wheel is freely disposed to a limited extent as regards said frame.

11. In a self propelled vehicle having a frame and carrying wheels therefor, propelling means comprising three coöperating elements, one an annular driving wheel adapted to roll freely upon and engage the surface of the ground and having an inner concentric surface, another an antifriction bearing journaled upon said frame within said concentric surface and of less diameter than the diameter of said concentric surface and the other an extensible driving means for said wheel adapted to permit said wheel moving forward or backward with its concentric surface against the surface of said bearing to reverse the motion of said vehicle.

12. In a self propelled vehicle having a frame and carrying wheels therefor, propelling means, comprising, an annular driving wheel adapted to roll freely upon and engage the surface of the ground and having inner concentric surfaces spaced laterally apart, an antifriction roller bearing journaled upon said frame and having a pair of evenly disposed contacts against said concentric surfaces, the diameter of said bearing being less than the diameter of said concentric surfaces whereby said wheel is adapted while propelling said vehicle forwardly or backwardly to roll with said concentric surfaces impinging against said bearing, a belt engaging said wheel to revolve the latter, a driving element engaging said belt to propel the latter and a slack adjuster over which said belt passes, adapted while said belt remains operatively engaged with said wheel to permit reversal of said wheel.

13. In a self propelled vehicle, a supporting frame and carrying wheels for said frame, a floating propelling wheel disposed freely in said frame and adapted to ride upon and engage the surface of the ground independent of said frame and carrying wheels, said propelling wheel having an impelling surface concentric with the periphery of said propelling wheel, a gear carried by said propelling wheel, a power element carried by said frame and having a drive gear, a chain transmission over said gears, a slack adjuster associated with said chain, guides carried by said frame and associated with said propelling wheel to limit its lateral movement in said frame, an antifriction bearing carried by said frame and against which the impelling surface of said drive wheel is adapted to engage to propel said vehicle, the diameter of said bearing being less than the diameter of said propelling wheel whereby said propelling wheel is freely disposed as regards said bearing and vehicle.

14. In a self propelled vehicle having a frame and carrying wheels therefor, a propelling element disposed freely in said frame having inner concentric surfaces, bearing surfaces carried by said frame of less diameter than the diameter of said concentric surfaces and arranged on an axis substantially parallel with the axis of said propelling wheel when the latter is in normal position, said bearing surfaces forming a pair of bearings against which said concentric surfaces of said wheel are adapted to impinge to propel said vehicle, and a driving element acting in a plane across the axis of said propelling wheel substantially midway between and parallel with the planes of said concentric surfaces, whereby an even longitudinal force is exerted upon and by said propelling wheel as regards said vehicle.

15. In a self propelled vehicle having a frame and carrying wheels therefor, an antifriction roller bearing carried by said frame on an axis transverse to said frame and having flanges on its ends, a driving wheel arranged on an axis substantially parallel to the axis of said bearing and formed with two peripheral treads, a gear between said treads of less diameter than said wheel, and a pair of inner faces concentric with said treads, a chain belt engaging said gear, means on said frame for driving said belt to revolve said wheel and a slack adjuster associated with said belt to permit longitudinal movement of said wheel, said bearing being of less diameter than the diameter of said inner concentric faces and having its flanges adapted to engage the sides of said wheel to limit movement of said wheel longitudinally on its axis, and said wheel being adapted to tread freely upon the surface of the ground and said inner concentric faces to impinge against said bearing when said wheel is revolving to propel said vehicle forwardly or backwardly.

16. In a vehicle of the class set forth, a body frame having carrying wheels, a revoluble drive wheel adapted to roll on the ground free of the weight of said vehicle and having a propelling engagement against said frame and means for revolving said wheel, the periphery of said drive wheel forming propelling engagement with the ground of a lever whose engagement with said frame by said drive wheel produces an increasing tendency to lift the load of said frame and thereby increase the force of said peripheral engagement between said drive wheel and ground automatically in proportion to the amount of work performed by said drive wheel.

In testimony whereof, I have signed my name to this specification, in the presence of two subscribing witnesses.

WILLIAM A. SORG.

Witnesses:
H. L. FISCHER,
G. M. DEEBACH.

Copies of this patent may be obtained for five cents each, by addressing the "Commissioner of Patents, Washington, D. C."